(12) United States Patent
Fälldin

(10) Patent No.: US 10,619,310 B2
(45) Date of Patent: Apr. 14, 2020

(54) RAILWAY TRACK HEATING DEVICE

(75) Inventor: Agne Fälldin, Sundsvall (SE)

(73) Assignee: Stegia AB, Vasteras (SE)

( * ) Notice: Subject to any disclaimer, the term of this patent is extended or adjusted under 35 U.S.C. 154(b) by 1124 days.

(21) Appl. No.: 13/879,394

(22) PCT Filed: Oct. 13, 2011

(86) PCT No.: PCT/SE2011/000181
§ 371 (c)(1),
(2), (4) Date: May 10, 2013

(87) PCT Pub. No.: WO2012/050502
PCT Pub. Date: Apr. 19, 2012

(65) Prior Publication Data
US 2014/0151366 A1 Jun. 5, 2014

(30) Foreign Application Priority Data

Oct. 15, 2010 (SE) ...................... 1001020
Nov. 12, 2010 (SE) ...................... 1001104

(51) Int. Cl.
*E01B 7/24* (2006.01)
*E01B 19/00* (2006.01)
*H05B 6/10* (2006.01)

(52) U.S. Cl.
CPC ................ *E01B 7/24* (2013.01); *E01B 19/00* (2013.01); *H05B 6/101* (2013.01); *H05B 6/105* (2013.01); *Y02A 30/38* (2018.01)

(58) Field of Classification Search
CPC ........... H05B 6/101; H05B 6/105; E01B 7/24; E01B 19/00

USPC .................................................. 219/634, 635
See application file for complete search history.

(56) References Cited

U.S. PATENT DOCUMENTS

| 4,656,333 | A | * | 4/1987 | Murphy .................... E01B 7/24 219/201 |
| 5,389,766 | A | * | 2/1995 | Takahashi ................. E01B 7/24 104/279 |
| 5,401,939 | A | * | 3/1995 | Iguchi .................. H05B 6/1254 219/624 |
| 6,195,525 | B1 | * | 2/2001 | Maeyama .......... G03G 15/2039 219/216 |
| 6,664,521 | B1 | | 12/2003 | Kondo et al. |

(Continued)

FOREIGN PATENT DOCUMENTS

EP 1582627 A1 10/2005
JP 9-296404 A 11/1997

OTHER PUBLICATIONS

Sweden Patent Office, Int'l Search Report in PCT/SE2011/000181, dated Feb. 1, 2012.

*Primary Examiner* — Dana Ross
*Assistant Examiner* — James F Sims, III
(74) *Attorney, Agent, or Firm* — Nixon & Vanderhye P.C.

(57) ABSTRACT

A device for heating of railway tracks is provided. The device comprises a magnetic field generator fed with a low-frequency current. The magnetic field generator is formed by a device without a circuit returning a magnetic flux generated by the magnetic field generator. Hereby the magnetic flux can be returned via a heater. The heater is a material generating heat when placed in the magnetic field. The heater can be the railway tracks or a plate provided in conjunction with the railway tracks.

16 Claims, 7 Drawing Sheets

(56) References Cited

U.S. PATENT DOCUMENTS

2010/0084390 A1\* 4/2010 Ohlsson .................... E01B 7/24
219/213

\* cited by examiner

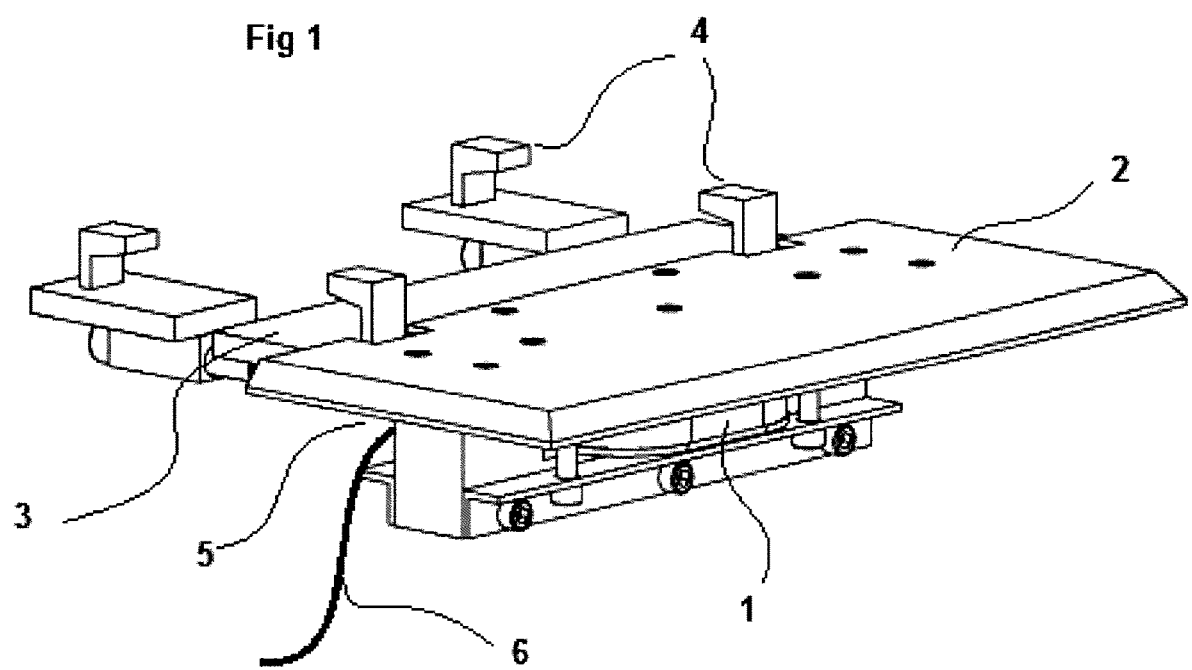

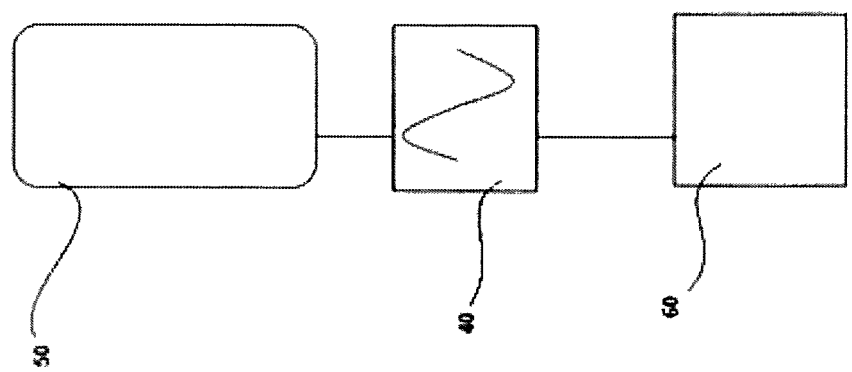
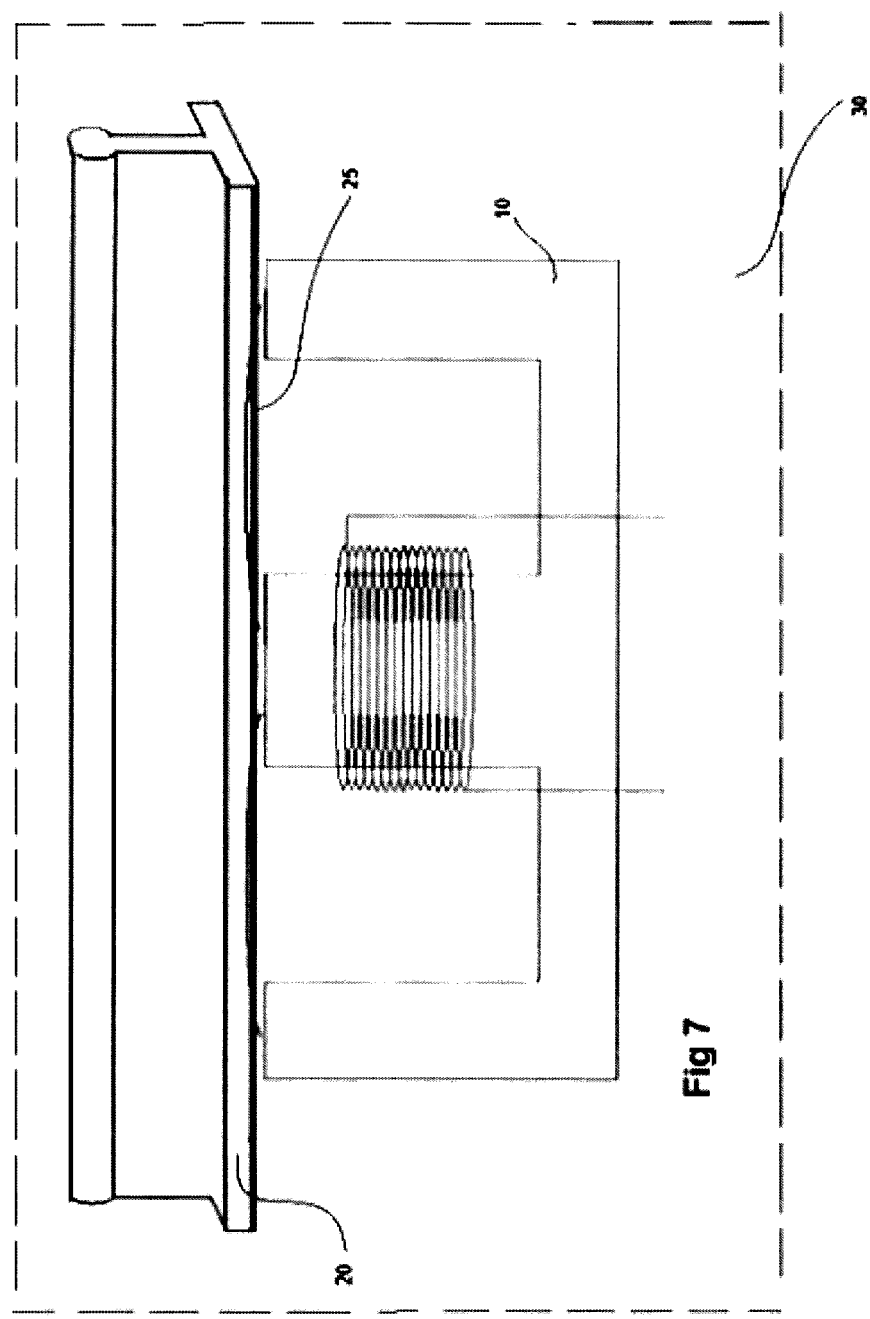
Fig 7

RAILWAY TRACK HEATING DEVICE

TECHNICAL FIELD

The present invention relates to devices for removing snow and ice from railway tracks and in particular from rail road switches.

BACKGROUND

In winter climates there is a high demand to keep railway tracks free from snow and ice. The methods and devices used for removing the snow and ice range from manually removal to thawing and heating devices of different types.

For example U.S. Pat. No. 6,664,521 describes an inductive snow melting device. The device in U.S. Pat. No. 6,664,521 removes snow by heating a floor plate using a heating coil that is fed with a high frequency current.

Today, there is a trend toward a higher use of railways for transportation of goods and people. This has led to a higher utilization of railways. This in turn has resulted in that the maximum capacity of railroads now has been reached or almost reached in many places. The railway must hence be constantly available and there is little or no time to manually remove ice or snow from the tracks or thaw them with conventional thawing devices.

Hence there exists a need for new devices providing improved performance in snow and ice removal from railway tracks.

SUMMARY

It is an object of the present invention to provide an improved methods and devices to address the problems as outlined above.

This object and others are obtained by the methods and devices as set out in the appended claims.

As has been realized by the inventor, an inductive ice-melting and snow removal device making use of a high-frequency input current such as the device described in U.S. Pat. No. 6,664,521 has great limitations. For example, the need for high frequency components in an environment in need of ice-melting and snow removal is highly unsuitable and can cause malfunction in the system. The mean-time before failure (MTBF) will also be short.

Further, high frequency components are not desired because there will be a risk of interference with other electrical devices, in particular radio frequency devices.

The present invention solves the above problems in that an inductive heating device fed with a low-frequency current is provided. Thus, by generating heat with an inductive heating device designed to operate on low-frequency current a number of advantages can be achieved.

In accordance with embodiments described herein a device for heating of railway tracks is provided. The device comprises a magnetic field generator fed with a low-frequency current. The magnetic field generator is formed by a device generating a magnetic flux without a circuit returning the magnetic flux generated by the magnetic field generator. Hereby the magnetic flux can be returned via a heater. The heater is a material generating heat when placed in the magnetic field from the magnetic field generator. The heater can be the railway tracks or a plate provided in conjunction with the railway tracks.

The use of an inductive heating device fed with a low-frequency current in accordance with some embodiments will thus provide numerous advantages over existing devices for removing snow and ice from railway tracks. The advantages includes but are not limited to an effective use of the applied power, heat generation in a well-defined area, a simple and robust design with a high MTBF, and no high frequency radio frequency interference.

BRIEF DESCRIPTION OF THE DRAWINGS

The present invention will now be described in more detail by way of non-limiting examples and with reference to the accompanying drawing, in which:

FIG. 1 is a view of a railway track heating device,

FIG. 7 is a view of a heating device for removing snow and ice from a railway switch.

DETAILED DESCRIPTION

Figures 2A, 2B:
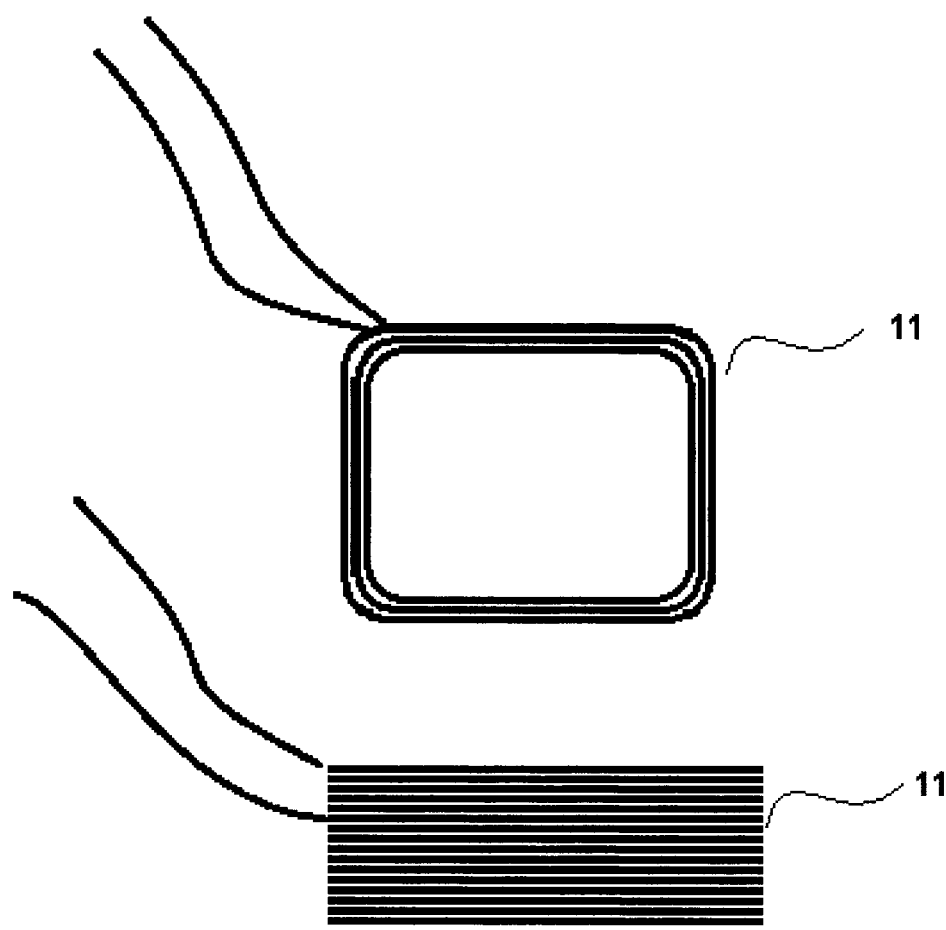
FIGS. 2a-5 are views depicting some parts of a railway track heating device.

In FIG. 1 a general view of an exemplary heating device for heating railway tracks is depicted. The heating device is provided for the purpose of ice-melting and snow removal. This is also referred to as defrosting.

The railway track heating device in FIG. 1 is formed by a magnetic field generator 1 formed by an induction core having a coil. The magnetic field generator is operative to work in conjunction with a heat element 3 in which the magnetic field generated by the magnetic field generator is transformed into heat. The heat element can be a section of the railway or some other metal portion having magnetic flux properties that are worse than the induction core. In particular the heat element can be combined with a heat spreader 2 as described below. Hereby, the magnetic flux generated by the magnetic field generator will heat the heat element 3.

The heat element 3 can be supplemented by a heat spreader 2. The purpose of the heat spreader is to spread the heat generated in the heat element 3 over a larger area. The heat spreader can be secured to the railway tracks by means of a securing device 4. The securing device can be clamped around the bottom section of the railway tracks and also be attached to the inductive core whereby the heating device can be held in place. The magnetic field generator is fed with a low frequency power via a power cable 6. To control the heat generated by the device a thermostat 5 can be provided that is operative to turn the power supply off and on in response to the current temperature.

The magnetic field generator can be formed by an arrangement having a coil driving a magnetic flux in an inductive core, but without a circuit returning the magnetic flux. Instead the heating device, such as the railway tracks or a heat element, will serve as a return for the magnetic field generated by the magnetic field generator. The railway tracks have poor properties for conducting a magnetic flux. As a result the railway tracks will generate heat when placed as a return closing the loop for the magnetic flux.

Some different parts of the device in FIG. 1 will now be described in more detail with reference to FIGS. 2a-5.

In FIG. 2a a coil 11 that can be fed with a low frequency current is depicted in a top view. The coil can be formed by a material having good electrical conductive properties such as copper. The low frequency current flowing through the coil 11 will cause the generation of a magnetic field. The frequency of the low-frequency current can be selected to any suitable value. However, the use of a current frequency already at hand where the magnetic field generator is to be deployed is typically advantageous. Hence, the coil can be fed with a current having a frequency of 16, 50 or 60 Hz. In FIG. 2b the coil 11 is depicted from the side. Also more than one coil can be used for generating the magnetic flux.

Figure 2C:
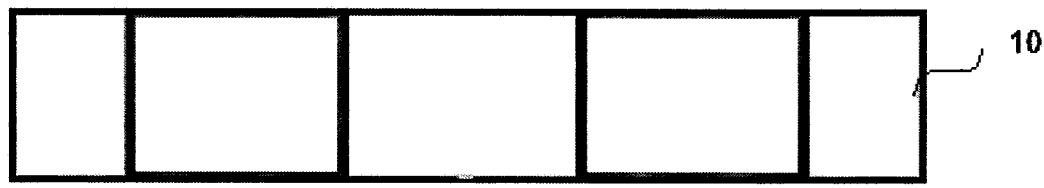
Figure 2D:
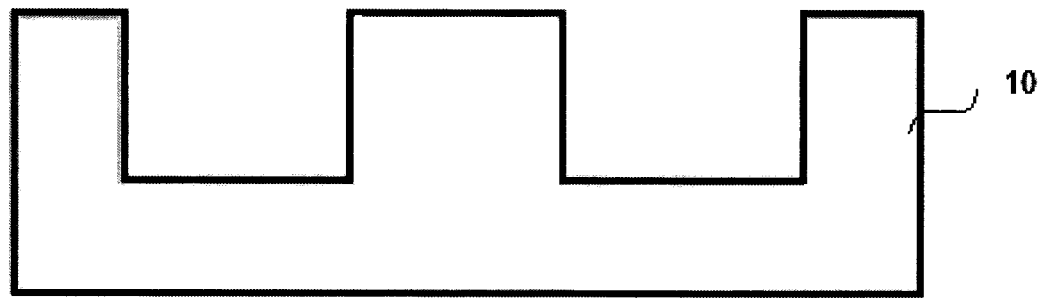

In FIG. 2c a top view of an inductive core 10 is depicted. In FIG. 2d a side view of the inductive core 10 is shown. The inductive core in FIGS. 2c and 2d is generally E-shaped and can be formed by a material having good properties for a magnetic flux. The inductive core can be made from transformer plates. In another embodiment (not shown) the inductive core can be generally U-shaped. Other forms of the inductive core are possible. In general the form of the core is such that a magnetic flux flowing in the core will need to be closed via some other material than the core. Hence the inductive core 10 will have a form without closed loops. Hereby a coil around the inductive core fed with an alternating current will drive a flux in the inductive core and where the flux will need to be closed outside the inductive core. This is generally referred to as a magnetic field generator herein.

Figure 2E:
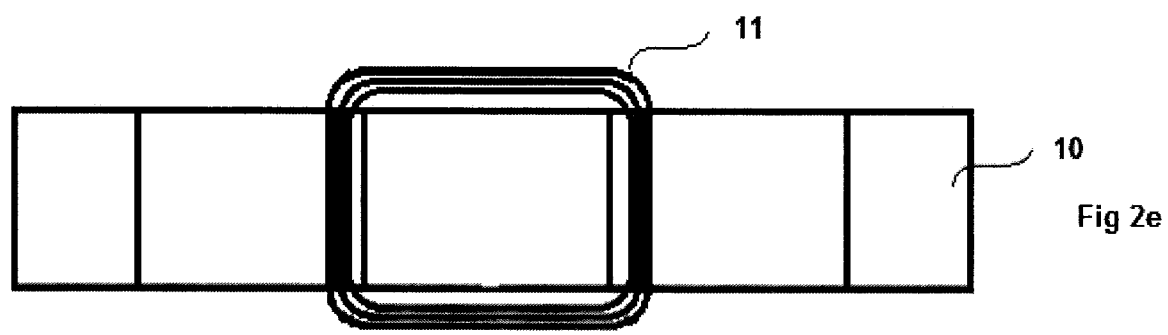
Figure 2F:
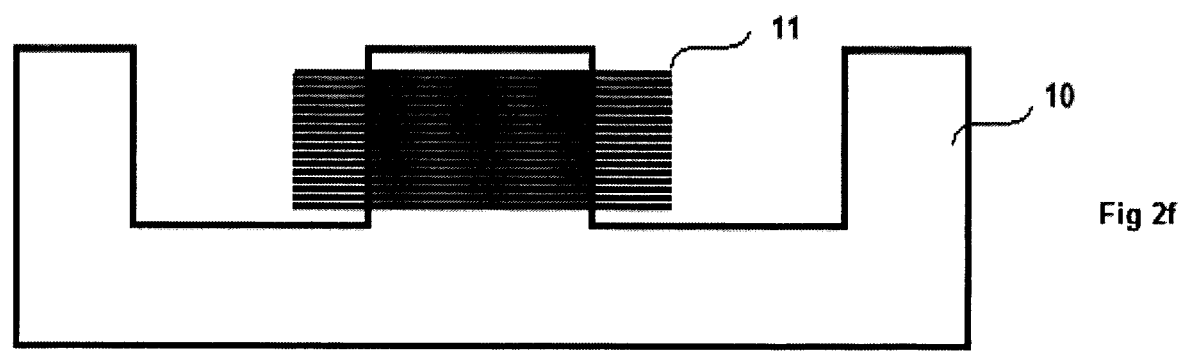

In FIG. 2e, a top view of a magnetic field generator formed by a coil 11 and an inductive core 10 is shown. The coil is located around the mid-section of the generally E-shaped inductive core. When fed with a low frequency current, a magnetic flux will be generated inside the inductive core and on top of the inductive core. In FIG. 2f a top view of a magnetic flied generator formed by a coil 11 and an inductive core 10 is shown.

Figure 3A:
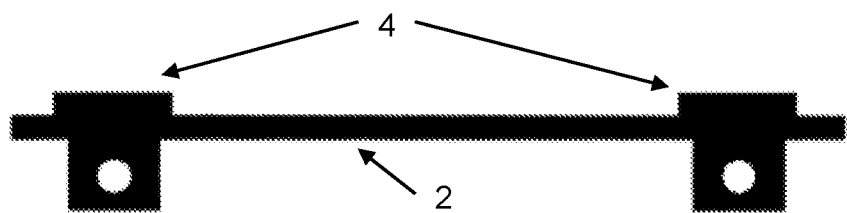
Figure 3B:
Figure 3C:

In FIG. 3a a cross sectional view of a heater is shown. The heater comprises a heat spreader 2 with securing device 4. Also the bottom of the railway tracks is shown. FIG. 3b is a lateral view of the heat spreader and in FIG. 3c the heat spreader is shown in a top view. The heat spreader can be made from a plate of aluminum or some other material with poor properties for conduct magnetic flux or stated differently having good properties for generating heat when placed in a magnetic flux. The heat spreader can be provided with holes or slits to increase the heating and to spread the heating better over the plate.

Figure 4A:
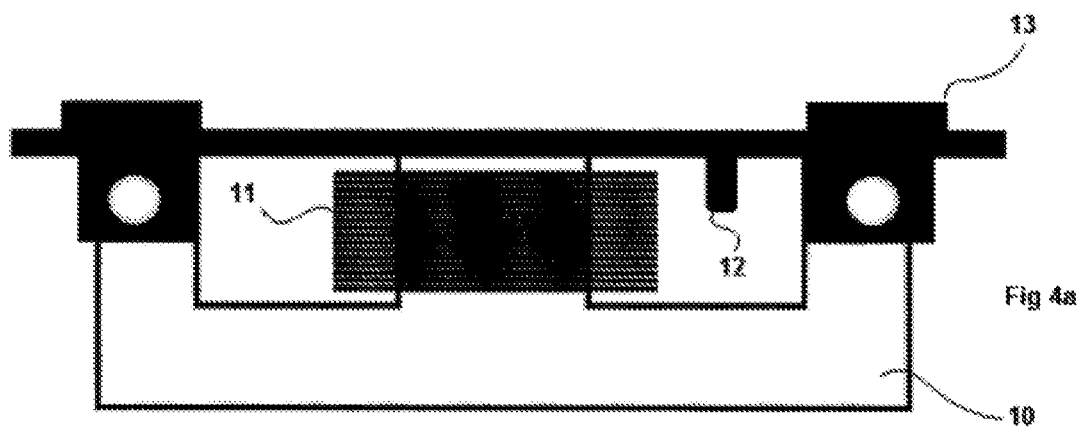
Figure 4B:
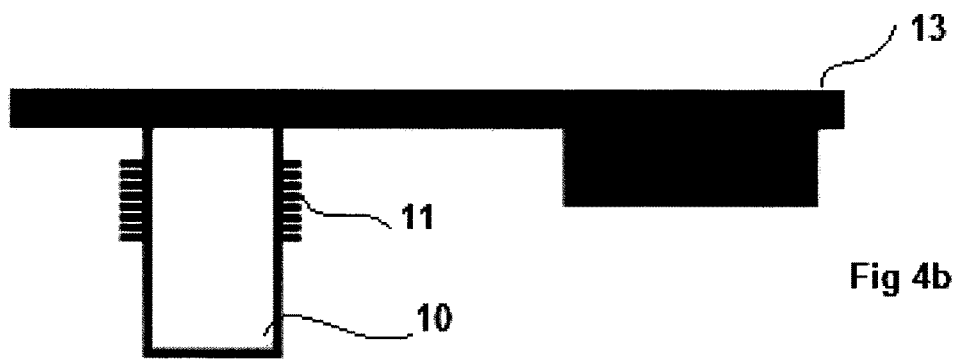
Figure 4C:
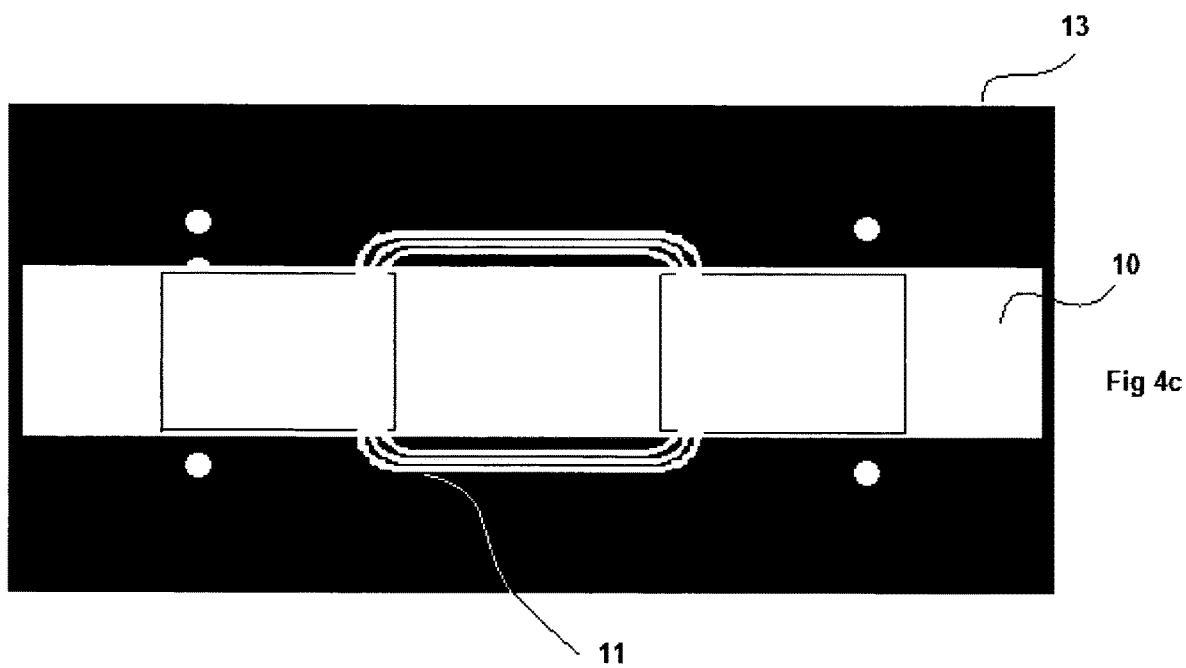

In FIG. 4a a cross sectional view of a heating device formed by the magnetic field generator of FIG. 2f when combined with the heater of FIG. 3a. Thus, the heater, generally denoted with reference numeral 13, is placed on top of the magnetic field generator formed by an inductive core 10 and having at least one coil 11 for generating a magnetic flux. Because the arrangement formed by the inductive core and the at least one coil has no circuitry for returning the magnetic flux on the top of the magnetic field generator, the magnetic field on top of the magnetic field generator will pass through the heater 13. The heater 13, which can be the railway tracks or a plate or some other suitable heat generating device, will return the flux to the inductive core and thereby close the loop for the magnetic flux generated by the at least one coil. The heater can be optimized to generate a maximum amount of heat from the magnetic flux flowing through the heater. To control the heat a thermostat 12 can be used. The thermostat 12 can be provided to control the low frequency current power fed to the coil 11. In FIG. 4b a lateral view of the heating device is shown. In FIG. 4c a top view of the heating device is shown.

Figure 5:
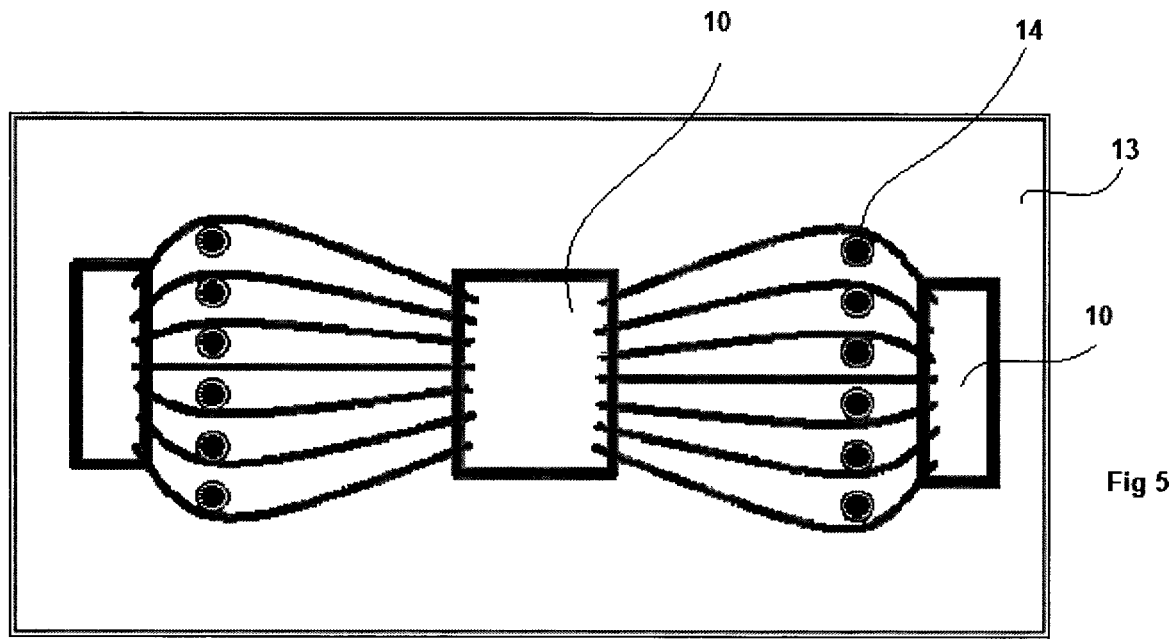

In FIG. 5 another top view of the heating device is shown. In the top view of FIG. 5 the purpose of the holes or slits in the heater 13, in particular the heat spreader, is illustrated. Thus by providing holes or slits in the heat spreader the magnetic field lines shown in FIG. 5 are made to go around the holes or slits thereby spreading the magnetic flux over a wider area, which turn spreads the heat better.

Figure 6:
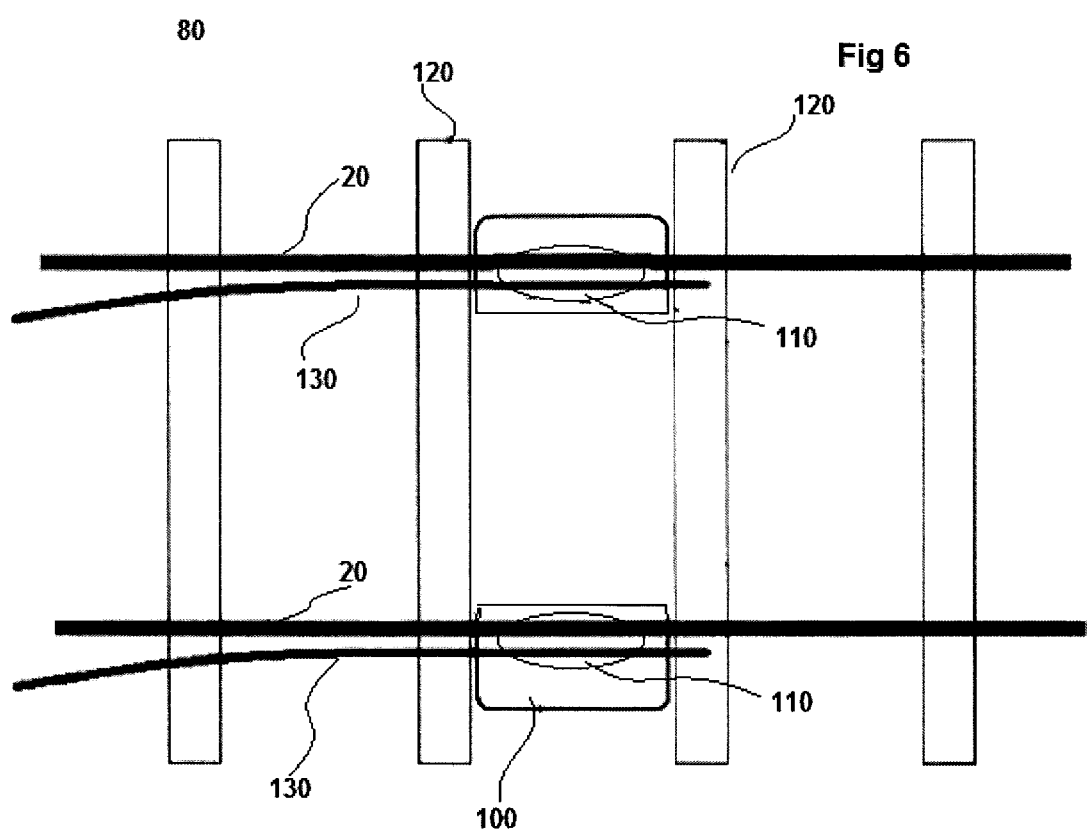
FIG. 6 is a view of a railway track heating device.

In FIG. 6, a railway switch 80 is depicted. The switch 80 is provided with inductive heaters 100. The inductive heaters can for example be any of the heating devices as described above. For example the heater can be a heater 13 as set out above.

The heater 100 is heated used inductive arrangements 110. The inductive arrangements can be of the type described above formed by an inductive core 10 in which a magnetic flux is generated by at least one coil, and where the magnetic flux is made to return via the heater 100. The heater can comprise a plate of the type described above which can be located between the sleepers 120 of the railway track. In particular the heater can be located beneath the points of the railway switch. Hereby it is possible to keep the switch free from snow and ice.

In FIG. 7, a heating arrangement having a magnetic field generator in accordance with the above is shown. The magnetic field generator comprises a coil that can drive a magnetic flux in the E-shaped core. The arrangement can be said to resemble a transformer arrangement without a circuit closing the magnetic flux. Hereby, a magnetic field 25 is generated outside the core. The arrangement is used to heat railway tracks 20. By providing a magnetic field generator in conjunction with railway tracks an arrangement whereby the railway tracks can be heated using a magnetic field generated by the magnetic field generator. The magnetic field is illustrated by magnetic field lines 25 in FIG. 7. The rails are hereby heated using induction. The magnetic field generator (the inductive core 10) will it self not be heated. Instead the magnetic field will generate heat in the metal forming the railway tracks.

In accordance with some embodiments one or more magnetic field generators are located between the sleepers of the railway track. Further, entire railway sections can be heated as one unit. Typically, the lateral heating is limited compared to vertical heating whereby the heating can be made local at locations where heating is deemed important and or desired. For example such locations can be railway switches, which can become stuck due to ice and snow.

As set out above, the magnetic field generator can be fed via a power supply 30 with a suitable voltage and frequency. For example the arrangement can be fed from an existing power supply. Thus, if only 16 Hz is available at the location where the arrangement is to be deployed (because the railway is operated using 16 Hz power supply), the arrangement can be designed/dimensioned to operate at this frequency. Other suitable power frequencies can be 50 Hz and 60 Hz. The heating power generated by the arrangement can be dimensioned in accordance with the heating demand. For example the arrangement when used for a railway switch can be dimensioned to generate heating power in the range 10-500 W, other heating powers are also envisaged.

In accordance with some embodiments the magnetic field generator is connected to a control unit. 40. The control unit is provided to control the power fed to the magnetic field generator so that a suitable heat is generated in the railway tracks. In accordance with one embodiment the control unit is connected to a heat sensor 50 provided in conjunction with the railway tracks. The heat sensor can be a thermostat or an IR-sensor or some other suitable sensor. The power fed to the magnetic field generator is controlled by the control unit 40 in response to the output signal from the sensor 50 or other sensors or controllers. The control unit 40 can further be connected to other sensors generally designated by reference numeral 60 in FIG. 7 from which data can be forwarded to control the magnetic field generator. For example input can be received about temperatures or whether forecast. The Heat can then be controlled based on forecast or outside temperature or other suitable parameters to prevent ice and snow on the railway track.

The invention claimed is:

1. A heating system, comprising:
   a railway track, including a rail positioned on top of a plurality of sleepers;
   a magnetic field generator that has a length along a side adjacent a bottom side of the rail and corresponding to a distance between successive sleepers of the railway track, that has a width perpendicular to the length, and that is fed with a low-frequency current provided by a low frequency power supply, the magnetic field generator thereby generating a magnetic flux; and
   a heat element, wherein
   the heat element returns the magnetic flux generated by the magnetic field generator, thereby being heated by returned magnetic flux,
   the heating element is disposed beneath the rails of the railway track and between successive ones of the plurality of sleepers, and
   the heat element has a width parallel to the width of the magnetic field generator,
   the magnetic field generator is formed without a circuit returning a magnetic flux generated by the magnetic field generator and the heat element returns the magnetic flux generated by the magnetic field generator.

2. The heating system of claim 1, further comprising a heating sensor configured to control the heating.

3. The heating system of claim 2, wherein the heating sensor includes a thermostat.

4. The heating system of claim 2, wherein the magnetic field generator comprises a core and at least one coil generating a magnetic flux in the core when fed with the low-frequency current, and a magnetic flux property of the heat element is worse than a magnetic flux property of the core.

5. The heating system of claim 4, wherein the heat element is disposed on top of the magnetic field generator.

6. The heating system of claim 1, wherein a frequency of the low-frequency current is 16, 50, or 60 Hertz.

7. The heating system of claim 1, wherein the heat element is located under switch points of a railway switch.

8. The heating system of claim 1, wherein the heat element is aluminum.

9. The heating system of claim 1, wherein the magnetic field generator comprises a core and at least one coil generating a magnetic flux in the core when fed with the low-frequency current.

10. The heating system of claim 9, wherein the core of the magnetic field generator is generally E shaped.

11. The heating system of claim 9, wherein the magnetic field generator is configured to use the railway track to close a magnetic field generated by the magnetic field generator.

12. The heating system of claim 1, wherein the heat element is positioned adjacent the track such that the track is heated by the heat element.

13. The heating system of claim 1, further comprising a heat spreader, wherein the heat spreader is also heated by returned magnetic flux.

14. The heating system of claim 1, wherein the heating element has a length corresponding to a length between successive sleepers of the railway track.

15. The heating system of claim 1, further comprising a securing device that extends in a direction parallel to the width, that is shaped to be secured to the bottom side of the rail, and that locates the magnetic field generator to be offset from a center of the rail in the direction parallel to the width.

16. A heating system, comprising:
   a railway track, including a rail positioned on top of a plurality of sleepers;
   a magnetic field generator that has a length along a side adjacent a bottom side of the rail and corresponding to a distance between successive sleepers of the railway track, that has a width perpendicular to the length, and that is fed with a low-frequency current, the magnetic field generator thereby generating a magnetic flux; and
   a heat element, wherein
   the heat element returns the magnetic flux generated by the magnetic field generator, thereby being heated by returned magnetic flux,
   the heating element is disposed beneath the rails of the railway track and between successive ones of the plurality of sleepers,
   wherein the heat element includes holes or slits positioned to spread the magnetic flux.

* * * * *